June 20, 1933.  A. LACHMAN  1,914,668
METHOD OF REMOVING ACID FROM HYDROCARBON VAPORS
Filed May 29, 1931
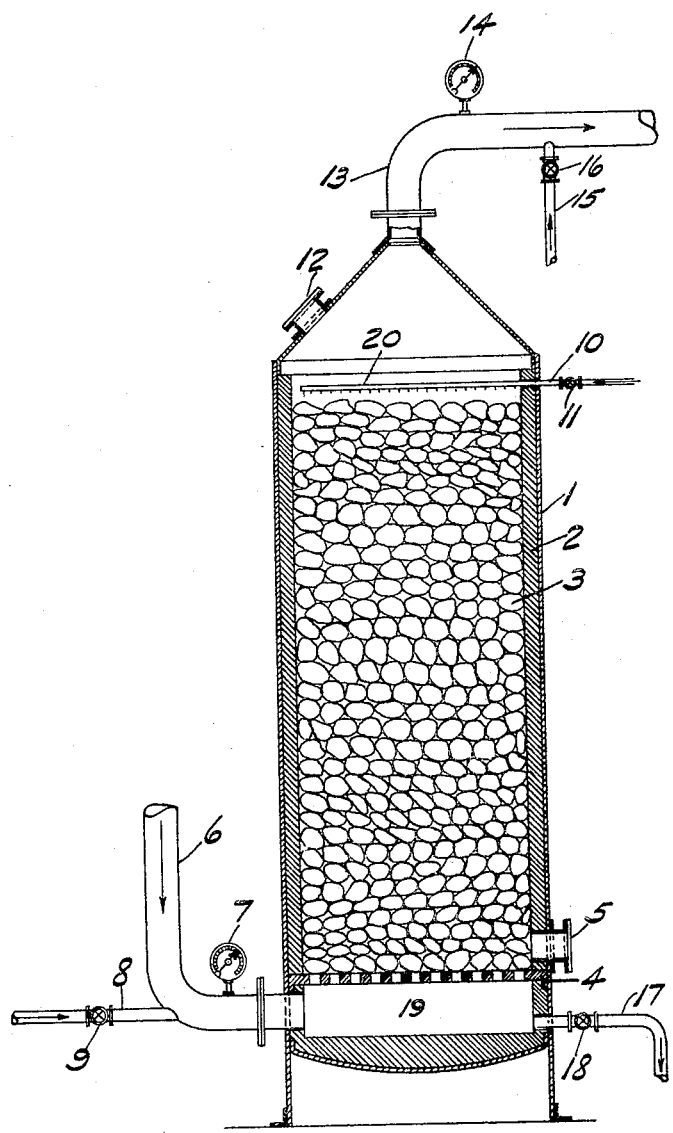
INVENTOR
ARTHUR LACHMAN
BY
Marvin L. Chappell
ATTORNEY Patented June 20, 1933

1,914,668

UNITED STATES PATENT OFFICE

ARTHUR LACHMAN, OF BERKELEY, CALIFORNIA, ASSIGNOR, BY MESNE ASSIGNMENTS, TO VAPOR TREATING PROCESSES INC., A CORPORATION OF CALIFORNIA

METHOD OF REMOVING ACID FROM HYDROCARBON VAPORS

Application filed May 29, 1931. Serial No. 540,855.

This invention relates to a method of removing acid or acid constituents from hydrocarbon gases or vapors, produced by distillation or vaporization operations of hydrocarbons such as crude petroleum oil, mineral oils or products of the same, to prevent corrosive action on the equipment employed for the further processing of the vapors, such as heat exchange, fractionation, condensation, etc; for the removal of acid or acid constituents after a vapor phase treatment of oil vapors with a water solution of a metallic halide, such as the bromide or chloride of zinc, copper, cadmium, mercury, iron, chromium, manganese, aluminum, nickel or cobalt; for the removal of organic acids or organic acid constituents from oil vapors produced in distilling petroleum oil containing oxidized hydrocarbons; or for the removal of any acid or acid constituent from oil vapor produced by any method in processing oil, in which the acid or acid constituent will react with calcium carbonate at elevated temperatures to form water soluble salts, which salts will remain in a fluid condition with water at the pressure and temperature employed.

In the distillation of crude petroleum oil containing chloride salts, such as magnesium or calcium chloride, hydrolysis of these chloride salts takes place under distillation conditions (elevated temperatures and low partial water vapor pressures), with the resultant formation of hydrochloric acid, also in the vapor phase treatment for refining hydrocarbons with a water solution of the halide salts previously enumerated. Heretofore, it has been customary to prevent such corrosive action of hydrochloric acid or other acid constituents by means of the addition of ammonia gas to the vapors, thus forming ammonium chloride, or by the addition of water solutions of various alkalies such as sodium hydroxide, sodium carbonate, milk of lime, etc.

The use of these various reagents is, however, accompanied by operative difficulties, and moreover the reagents themselves are relatively expensive. Thus, for example, the use of ammonia gas will under ordinary conditions of separating gasoline from crude petroleum oil by distillation result in the deposit of a dry powder of ammonium chloride in the distilling apparatus, thus interfering with its normal operation. It has therefore been customary in the use of ammonia gas to combat corrosion, to add the ammonia gas to the vapors after they leave the fractionating equipment, and thereby run the risk of corroding it.

When aqueous solutions or suspensions of alkalies are used, it is not possible under modern conditions of practice to add these solutions to a fractionating tower, as the evaporation of the water content would cause uncontrolled cooling, and therefore irregular operation of the tower. The salts which are thereby produced also tend to clog the trays and drain pipes of the fractionating tower. Such aqueous solutions are, therefore, also preferably added to the crude oil before vaporization, or to the vapors after they leave the fractionating equipment.

I have found that it is possible to employ as a neutralizing agent for hydrocarbon vapors containing acid a material which is water insoluble, but which is acted upon by acid even when the vapors are superheated with reference to their water content. Thus, for example, at a temperature of 335 degrees F. and a water vapor content of approximately 50 per cent by volume of the hydrocarbon vapors (equal to approximately 40 pounds of water per barrel of condensed gasoline), the vapor is dry in the ordinary sense of the term. However, if such a hydrocarbon vapor is passed over solid calcium carbonate, from 90 to 99 per cent of any hydrochloric acid gas it may contain is removed, and the remaining trace of acid may be neutralized, if desired, with ammonia gas.

For example, a gasoline vapor, containing water vapor in the above given proportion (namely, 40 pounds of water per barrel of liquid gasoline), and sufficient hydrochloric acid gas so that when condensed the aqueous phase carried hydrochloric acid of a normality equal to 0.07, was passed through a tower containing broken lime stone, the temperature being 330–335 degrees F. The vapors when condensed gave an aqueous phase whose acidity was then equal to 0.0008 normality, showing a reduction of approximately 99 per cent of acidity, in which case the use of ammonia to complete the neutralization would not be necessary to avoid corrosion.

Under the conditions of temperature and water saturation given, and under low water vapor partial pressures, the calcium salt, which is formed by the inter-action of hydrochloric acid in the hydrocarbon vapors and the calcium carbonate employed, collects preferably on the surfaces of the calcium carbonate, impeding the neutralizing action to a considerable extent. It is therefore desirable to remove this calcium salt either intermittently or continuously so as to present fresh clean surfaces of calcium carbonate to the incoming vapors. If operating conditions will permit, this may be accomplished simply by a continuous or intermittent addition of water to the top of the lime stone column.

If, however, conditions do not so permit, the same result may be achieved by an increase of the absolute water vapor pressure of the system to a value somewhat above one atmosphere. For example, a gasoline vapor carrying 40 pounds of water per barrel of condensed liquid gasoline will show a partial pressure of 0.50 of water vapor, that is to say, approximately equal volumes of gasoline vapor and water vapor are present in the system. If the absolute vapor pressure in the system is one atmosphere, under these conditions the absolute pressure of water vapor in the system is only 0.5 atmosphere, and the calcium chloride formed is present as a hydrated but solid phase adhering to the surface of the calcium carbonate. If, however, the absolute pressure of the vapor is raised from one atmosphere to approximately two atmospheres, then the absolute water vapor pressure in the system rises to a value of approximately one atmosphere, and at the temperature chosen, namely 330–335 degrees F., the hydrated calcium chloride will become deliquescent and will drip off from the surfaces of the calcium carbonate.

The same result may be achieved by introducing additional water vapor into the hydrocarbon vapors whose acidity is to be reduced by this means. Thus, for example, an increase of water vapors from 40 pounds to 60 pounds per barrel of gasoline will increase the partial water vapor pressure from 0.5 to 0.6; at an absolute pressure of 1.85 atmospheres for the total vapor, the absolute water vapor pressure will become 1.1 atmospheres, again a deliquescent condition.

The temperatures given, namely 330–335 degrees F., do not represent any arbitrary set of values. They happen to be the average vapor temperatures observed in continuous treating of gasoline with zinc chloride solutions. If higher temperatures are necessary to maintain the hydrocarbons in the vapor phase, relatively higher absolute water vapor pressures must be selected. On the other hand, if the gasoline can be maintained at a lower temperature of vaporization, then a reduction in the partial and the absolute water vapor pressures is permissible.

The method of removing hydrochloric acid and other acid vapors from gases containing water vapor is limited to such insoluble materials capable of neutralizing acid whose halides or other salts are not appreciably hydrolyzed under the given conditions. Therefore, any other carbonate of the calcium group, such as barium and strontium carbonates, might be chosen if available.

It is the object of the present invention to provide an economical method for the removal of acid or acid constituents from hydrocarbon gases or vapors produced in processing hydrocarbon oils or products.

A further object of the present invention is to provide an inexpensive neutralizing and extracting agent in solid or lump form, which will remove acid or acid constituents from hydrocarbon gases or vapors at the vaporizing temperature of the hydrocarbon in refinery processing operations, and one which will produce little resistance to the flow of gases or vapors.

Other objects and advantages will be apparent from the following description of the preferred process, which will now be more fully explained by reference to the accompanying drawing, which is a diagrammatical representation of an apparatus in which the invention may be performed.

In the drawing, 1 represents generally a container or contact tower for holding the neutralizing agent, which is preferably lump limestone, designated by the numeral 3. The contact tower 1 is preferably lined with an acid proof lining 2, such as porcelain or porcelain brick held in place by an acid proof cement, although the shell or contact tower may be composed of any other acid resisting material. Contact tower 1 is provided with man-holes 5 and 12, by means of which it may be filled with contact material or emptied when desired. 6 represents a gas or vapor pipe which leads to a source of hydrocarbon gas or vapor not shown, and is conected to contact tower 1 at the bottom. Vapor pipe 6 is provided with pressure gauge 7, to indicate the pressure of vapor passing into contact tower 1. 4 is a grate extending across contact tower 1 to hold the contact material in place above the vapor inlet chamber 19.

Pipe 8, controlled by valve 9, is connected to pipe 6 and leads to a source of steam not shown. Pipe 17, controlled by valve 18, is connected to contact tower 1 at the bottom, and leads to a storage for waste supply not shown. Pipe 10, controlled by valve 11, passes through the shell of contact tower 1, ending in a spray pipe 20, and leads to a source of water or hot water not shown. A vapor outlet pipe 13 is connected to the top of tower 1, and leads to a condenser or any other processing device, not shown.

14 is a pressure gauge to indicate the pressure of the vapor after passing through tower 1, and is employed in conjunction with pressure gauge 7 to determine the differential pressure between the vapor inlet and the vapor outlet, so as to regulate the flow of fluids through the contact tower. Pipe 15, controlled by valve 16, is connected to vapor outlet pipe 13 and leads to a source of ammonia or ammonia gas, not shown, which may be employed continuously or at intervals when necessary to complete the neutralization of acid or acid constituents passing through contact tower 1 along with the hydrocarbon vapor.

The preferred process as carried out in the apparatus just described is as follows:

Hydrocarbon vapor and steam, either alone or mixed with hydrocarbon gases and containing acid or acid constituents, coming from any hydrocarbon oil distillation or other processing operation, passes through pipe 6 at the vapor temperature, and into lower section 19 of contact tower 1, which is filled with lump limestone 3. When naphtha or gasoline vapor is being processed by the present invention to remove acid or acid constituents, the vapor temperature ranges from about 300 to 340 degrees F., and the acid content may range from a trace to as high as 1 per cent by weight or higher. Preferably, contact tower 1 is maintained at a pressure of about 15 pounds gauge by automatic valve regulations or other known means. Higher or lower pressures may be employed, in which case water may be intermittently or continuously introduced into tower 1 through spray pipe 20, which is connected to pipe 10, the flow of water being controlled by valve 11. Pipe 10 leads to a source of water supply.

When necessary, this intermittent or continuous introduction of water through spray pipe 20 is carried out to dissolve and remove any calcium salts which may collect on the surfaces of the limestone lumps 3, so as to present clean surfaces of calcium carbonate to the incoming vapor. In carrying out my process at the preferred temperature of 330–335 degrees F., and at the preferred pressure of approximately 15 pounds gauge, the introduction of water to clean the surfaces of the limestone lumps is unnecessary when the proper proportion of steam is used, which, as previously stated, is approximately 40–60 pounds of water per barrel of liquid gasoline. The introduction of steam is carried out by a regulated opening of valve 9 in pipe 8, pipe 8 leading to a source of steam not shown.

From compartment 19 the hydrocarbon vapor containing the acid to be extracted, mixed with the introduced steam, at the preferred temperature of 330–335 degrees F. and under the preferred pressure of approximately 15 pounds gauge, as indicated by pressure gauge 7, passes up through grate 4 and then through the contact mass of lump neutralizing agent 3, wherein 90 to 99% of the acid content is extracted by the lump neutralizing agent, forming water soluble salt, which, in the presence of sufficient steam to maintain an absolute water vapor pressure of about one atmosphere, becomes deliquescent and drips off from the surfaces of the lump neutralizing agent, passes down into compartment 19 and is drawn off from compartment 19 by opening valve 18 in pipe 17, which conducts the dissolved fluid salt to a storage not shown.

The hydrocarbon vapor containing approximately 1 to 9 per cent of its original acid content passes out of contact tower 1 into pipe 13, the pressure of which is indicated by pressure gauge 14. The remaining acid contained by the hydrocarbon vapor and uncondensed steam passing through pipe 13 may be completely neutralized by a regulated opening of valve 16 in pipe 15, which leads to a supply of ammonia gas. Pipe 13 conducts the completely neutralized hydrocarbon vapor and uncondensed steam to a fractionating tower or directly to a condenser, and a condensed purified hydrocarbon oil is finally separated from the condensed water, and thereafter processed by other known operations or sold directly to the trade.

While the process herein described is well adapted for carrying out the objects of the present invention, various modifications and changes may be made without departing from the invention, and the invention includes all such modifications and changes as come within the scope of the appended claims.

I claim:

1. A process of treating hydrocarbon vapor containing hydrochloric acid, comprising, contacting the hydrocarbon vapor, under superatmospheric pressure of approximately 15 pounds gauge, commingled with steam, at temperatures ranging from 300 to 340 degrees F., and with a partial water vapor pressure of approximately 1 atmosphere, with a carbonate of the calcium group, and then separating hydrocarbon vapor, substantially free from hydrochloric acid, from excess carbonates and products of reaction.

2. The process of treating hydrocarbon vapor containing hydrochloric acid, as in claim 1, with the introduction of water in quantities sufficient to dissolve and remove acid reaction products from the carbonate.

3. The process of treating hydrocarbon vapor containing hydrochloric acid, as in claim 1, with the introduction of steam in quantities sufficient to dissolve and remove acid reaction products from the carbonate.

In testimony whereof I affix my signature.

ARTHUR LACHMAN.